United States Patent [19]

May

[11] Patent Number: 4,697,373
[45] Date of Patent: Oct. 6, 1987

[54] SHRIMPING/FISHING NET WITH VIBRATORY BOTTOM ROLLER

[75] Inventor: Billy D. May, Port St. Joe, Fla.

[73] Assignee: Boats of the Future, Inc., Lilburn, Ga.

[21] Appl. No.: 716,747

[22] Filed: Mar. 27, 1985

[51] Int. Cl.⁴ .............................................. A01K 73/02
[52] U.S. Cl. .......................................................... 43/9
[58] Field of Search .............................................. 43/9

[56] References Cited

U.S. PATENT DOCUMENTS

| | | | |
|---|---|---|---|
| 314,047 | 3/1885 | Moscopoulos | 43/9 |
| 436,541 | 9/1890 | O'Connor | 43/9 |
| 446,755 | 2/1891 | Johnson | 43/9 |
| 2,744,350 | 5/1956 | Bass | 43/9 |
| 3,458,947 | 8/1969 | Ross | 43/9 |
| 4,299,047 | 11/1981 | Collins | 43/9 |
| 4,351,127 | 9/1981 | Mitchell | 43/9 |

Primary Examiner—Gene P. Crosby
Attorney, Agent, or Firm—Jone, Askew & Lunsford

[57] ABSTRACT

An improved, high catch yield pull-behind net assembly particularly designed for shrimping and fishing operations in shallow coastal grass flats is provided which actually causes aquatic life to move upwardly into the net, is completely harmless to the ecology of the grass flats, and can be unloaded on the go without interrupting the fishing and shrimping. In preferred forms, the net assembly includes an upright, inclined, elongated mouth, a trailing net secured to the mouth, and a vibratory, multiple-bar elongated roller mechanism located adjacent the underside of the net mouth for supporting the overall assembly; the roller mechanism repeatedly strikes the bottom in advance of the net mouth, causing bottom-congregating aquatic life (e.g., shrimp and flounder) to move upwardly and pass into and through the net. The net mouth is also provided with a plurality of spaced, depending, spring steel rods which effectively "comb" the grass as the net is advanced to ensure maximum catches.

5 Claims, 7 Drawing Figures

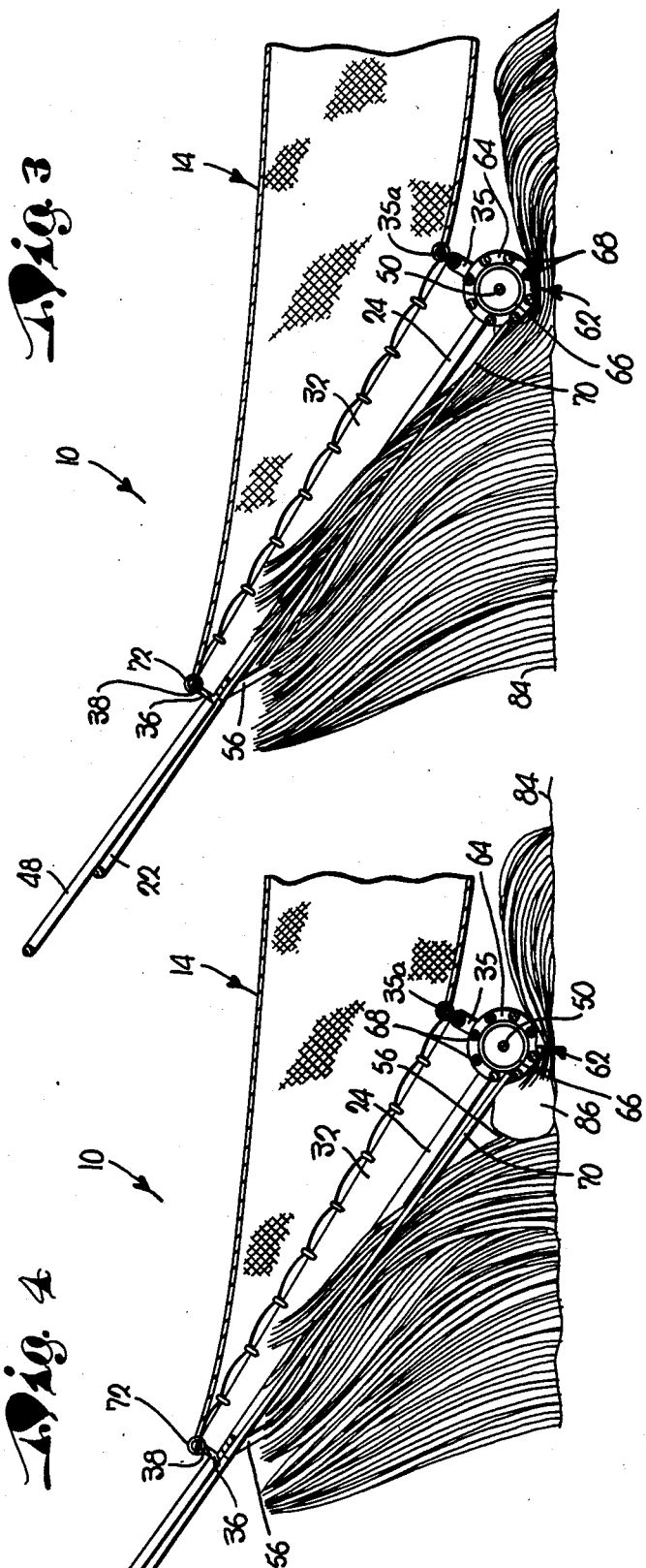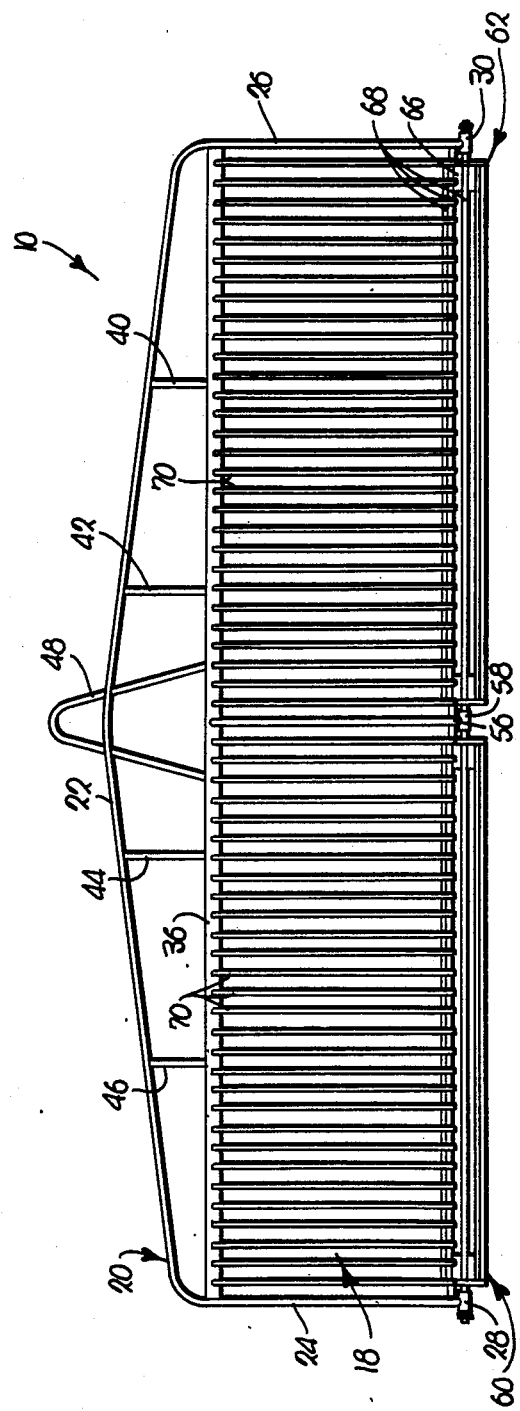

SHRIMPING/FISHING NET WITH VIBRATORY BOTTOM ROLLER

BACKGROUND OF THE INVENTION

1. Field of the Invention

The present invention is broadly concerned with a greatly improved net assembly (and a corresponding fishing or shrimping method) which is particularly designed to facilitate fishing and shrimping in shallow coastal grass flats which have heretofore been virtually impossible to exploit in commercial operations. More particularly, in preferred forms of the net assembly hereof, use is made of a lowermost, seabed-engaging vibratory roller, together with a plurality of upright, laterally spaced apart comb-like spring steel rods located across the net mouth; it has been found that the roller structure serves to repeatedly strike the bottom or seabed in advance of the net, causing bottom-congregating aquatic life to move upwardly, whereas the comb-like rods tend to separate small aquatic life such as shrimps and scallops from the sea grass in order to enhance catch yields.

2. Description of the Prior Art

Commercial shrimpers and fisherman have long known that a considerable bounty of aquatic life can be found in shallow coastal grass flats. However, typical shrimping trawlers are relatively large vessels of considerable draft, and therefore cannot venture into such shallows because of the very real possibility of running aground. In addition, typical net equipment used by commercial shrimpers and fishermen can do considerable damage to a seabed, to the point of virtually destroying the local ecology thereof. As a consequence, commercial shrimping and fishing operations have been largely limited to relatively deep waters, and moreover operations cannot be repeatedly conducted in the same area over short time periods because of the damage done to the seabed by nets and other apparatus employed.

Thus, while commercial fishermen are well aware of the commercial potential of operating in and around shallow grass flats, the equipment for such operations has simply not been available.

A recent significant advance in boat design is disclosed in application for U.S. Letters Patent entitled "shallow Draft Boat", Ser. No. 629,087, Filed July 9, 1984, now abandoned. This application describes a very shallow draft boat hull construction making use of a center motor well and other hull refinements. It has been found that boats made in accordance with the subject application (which is expressly incorporated be reference herein) can operate very effectively in extremely shallow waters of as little as one to two feet in depth. Moreover, the relatively light weight and maneuverability of this boat design can be used to good effect in fishing and shrimping operations. However, in order to fully utilize this new type of boat design, there is a need for an improved net assembly which is particularly adapted for commercial shrimping and fishing operations in coastal grass flats.

SUMMARY OF THE INVENTION

The present invention overcomes the problems noted above, and provides a greatly improved net assembly for shallow water operations. Broadly speaking, the net assembly of the present invention includes frame means defining an upright, elongated, transversely extending, open, catch-receiving mouth, along with means for attachment of a net in trailing relationship to the frame means and in disposition for capturing catch passing through the net mouth. In particularly preferred forms of the invention, the overall net assembly includes elongated, axially rotatable, bottom-engaging roller means operatively coupled with frame means and located along the normal underside of the net mouth. In other aspects of the invention, the preferred net assembly includes a plurality of elongated, laterally spaced apart rod-like fingers supported by the mouth-defining frame and extending in an upright direction for a substantial portion of the vertical extent of the net mouth. These fingers are preferably in the form of elongated, spring steel rods and effectively "comb" sea grass to facilitate removal of shrimp or scallops therefrom.

In greater detail, the lowermost bottom or seabed-engaging roller structure preferably is in the form of a pair of juxtaposed, axially rotatable roller members, each including a plurality of circumferentially spaced aparts metallic rods; as the roller members pass over the seabed in advance of the net, the seabed is repeatedly struck and gently vibrated. It has been found that this action actually causes bottom-congregating aquatic life such as shrimp and scallops to "jump" or move upwardly from the bottom and thereupon be in disposition for passing through the net mouth and into the trailing net structure.

The net assembly of the present invention has been proven to be highly efficient for shrimping and fishing operations to coastal grass flats and other relatively shallow water areas. Indeed, the most preferred net assembly of the invention, which includes the lower roller structure in conjunction with the comb-like rods, has given excellent results. To give but one example, in one night of operation with a pair of nets in accordance with the invention, approximately 600 pounds of shrimp were caught, together with 42 flounder and 2 bushels of scallops.

BRIEF DESCRIPTION OF THE DRAWINGS

FIG. 3 is a fragmentary view in partial vertical section of the preferred net-supporting frame during passage through a shallow grass flat;

FIG. 4 is a similar to that of FIG. 3, but illustrates the action of the net-supporting frame assembly in passing over a rock or other solid obstruction;

FIG. 5 is a front elevational view of the most preferred net-supporting frame assembly;

DESCRIPTION OF THE PREFERRED EMBODIMENT

Figure 1:
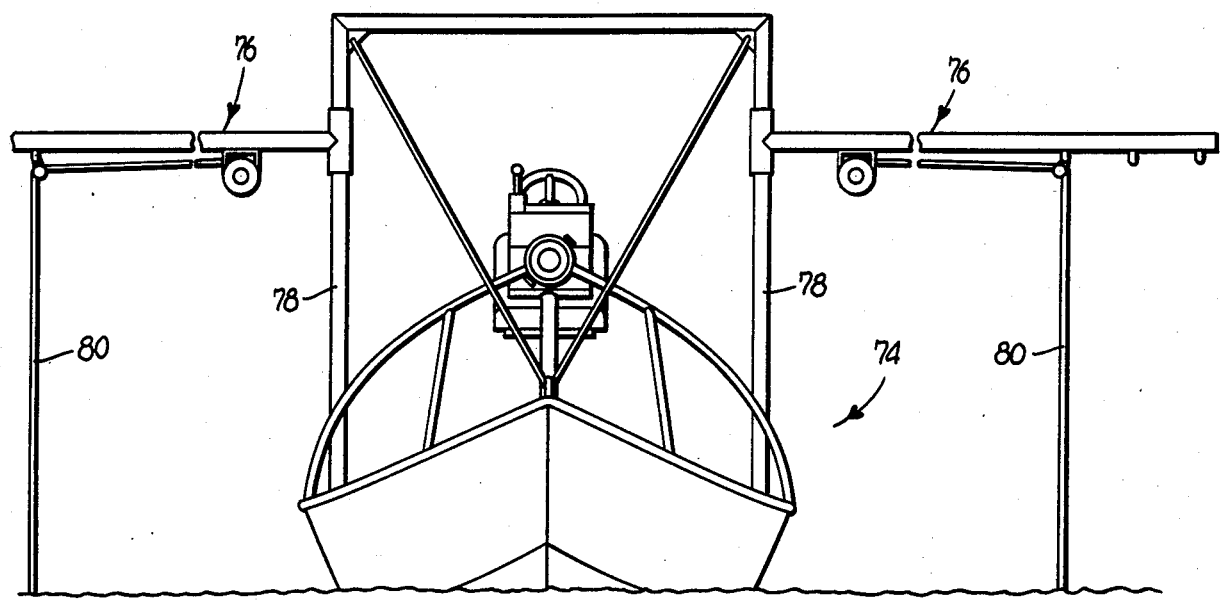
FIG. 1 is a fragmentary front elevational view of a boat equipped with a pair of laterally extending outriggers and appropriate lines for attachment to a pair of net assemblies in accordance with the invention.

Turning now to the drawings, and particularly FIGS. 2–7, the net assembly 10 of the invention broadly includes a leading, net-supporting frame assembly 12 together with an elongated, somewhat triangularly shaped in plan net 14 secured to the frame assembly 12. The latter generally includes frame means 16 which defines an upright, elongated, transversely extending, open, catch-receiving mouth 18. As can readily be appreciated from consideration of FIGS. 2–5, the net 14 is located in disposition for capturing catch passing through the mouth 18 as the overall net assembly 10 is pulled through the water.

In more detail, the frame means 16 include a continuous metallic rod 20 having an upper, gabled portion 22 and a pair of laterally spaced apart, depending outboard legs 24, 26. Each of the legs 24, 26 includes a sleeve 28, 30 at the lowermost end thereof which is important for purposes which will be made clear. Each of the legs 24, 26, includes rearwardly extending, apertured, frusto-triangular gusset plate 32, 34 which extend upwardly from the associated sleeve 28, 30 to the upper end of the corresponding leg. Finally, a U-shaped reinforcing tube 35, and an elongated, trailing net attachment rod 35a, are fixedly coupled to and extend rearwardly from the endmost sleeves 28, 30.

An elongated, transversely extending, L-shaped in cross-section frame member 36 extends between and is secured to the upper ends of the respective legs 24, 26, and defines the upper vertical edge of mouth 18. The frame member 36 is provided with a series of laterally spaced apart openings 38 therethrough along the entire length thereof, as best seen in FIGS. 3 and 4. Reinforcing struts 40–46 are secured between the upper frame member 36 and gabled portion 22 of rod 20, in order to rigidify the overall frame assembly 12. Moreover, an upright, somewhat U-shaped connection clevis 48 is secured to the member 36 adjacent the center thereof, in order to permit the net-supporting frame to be pulled through the water.

An elongated lower frame member 50 extends between the outermost depending legs 24, 26, and is received within the corresponding sleeves 28, 30. The member 50 is captively retained by means of a washer 52 and cotter pin 54 adjacent each of the opposed ends thereof and outboard of the corresponding sleeves 28, 30 (see FIG. 7). It will thus be appreciated that the upper portion of the frame assembly represented by the rod 20 and the structure connected thereto is pivotal relative to the lower frame member 50. Further, it will be seen that the catch-receiving mouth 18 is defined by the upper and lower frame members 36, 50, as well as the endmost depending legs 24, 26.

The overall frame assembly 12 also includes a central, forwardly extending, arcuate, seabed-engaging guiding rod or member 56. The upper end of the member 56 is secured to the frame member 36 at the center thereof, whereas the lower end of the guiding member 56 is provided with a sleeve 58 which pivotally receives the lower frame member 50. As will be more fully explained hereinafter, the guiding member 56 serves to establish the minimum operating angle of the frame means relative to the seabed as the overall net assembly is pulled through the water.

The frame assembly 12 is provided with a pair of separate, side-by-side elongated, axially rotatable rollers 60, 62. As best seen in FIG. 5, roller 60 is retained between the sleeve 28 and 58, whereas the roller 62 is retained between the sleeves 58, 30. In any event, and referring particularly to FIGS. 6 and 7, it will be seen that each of the rollers 60, 62 (which are identical in construction) includes, at each end thereof, an annular outermost plate 64 together with an inwardly projecting annular reinforcing wall 66 of lesser diameter than the outboard plate 64. Further, each roller includes a plurality (here 8) of elongated rods 68 which extend between and are fixedly connected to the endmost structure represented by the plates 64, 66. As illustrated, each of the rollers 60, 62 is centrally disposed relative to the lowermost frame member 50, and is rotatable with respect thereto.

The overall frame assembly 12 further includes a plurality of elongated, comb-like, spring steel fingers or rods secured to upper frame member 36 and depending therefrom. As best seen in FIG. 5, the respective rods 70 are in laterally spaced relationship to one another and extend a substantial portion of the vertical extent of mouth 18. In particular, it will be observed that the lowermost ends of the rods 70 terminate at a point below the upper periphery of the rollers 60, 62, in order to prevent movement of the fingers in a rearward direction past the respective rollers.

In the use of frame assembly 12, a net 14 is attached in trailing relationship thereto by securing the usual net rings 72 through, respectively, the apertures 38 in upper frame member 36, the rearmost apertures provided in gusset plates 32, 34, and over rearmost trailing net connection rod 35a. In this way, the net is firmly secured to the frame assembly 12, and in disposition for catching and retaining aquatic life passing through mouth 18.

Figure 2:
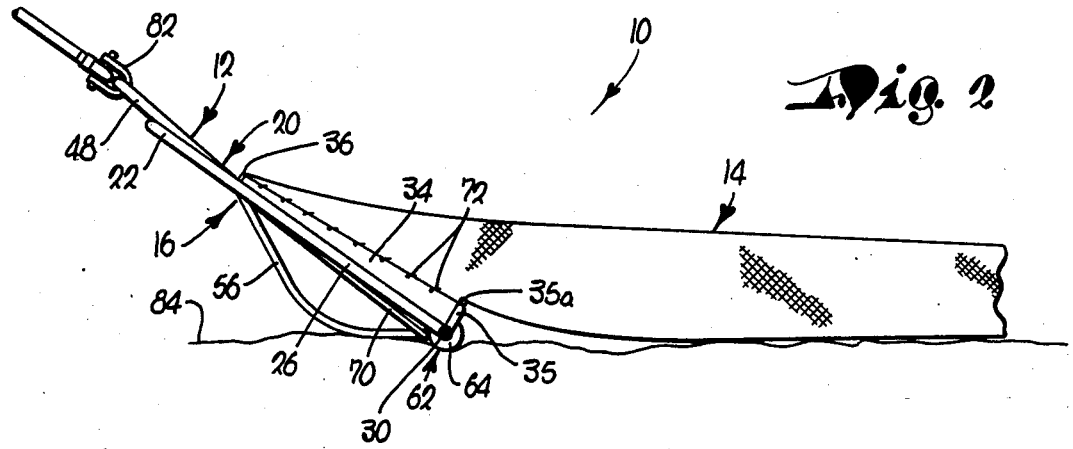
FIG. 2 is a fragmentary side view illustrating the most preferred net supporting frame assembly with a net secured thereto in trailing relationship.
Figure 6:
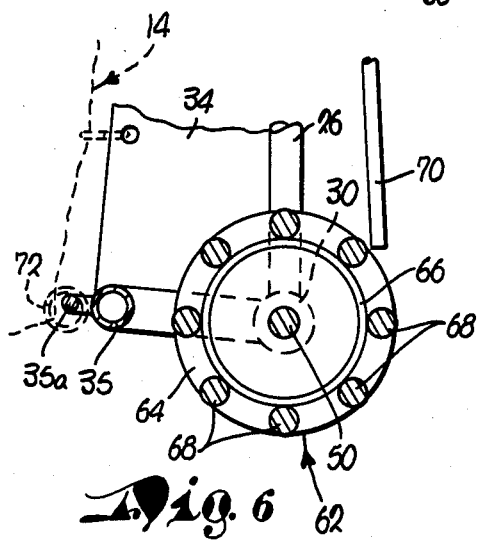
FIG. 6 is an enlarged fragmentary view in partial vertical section, and with parts depicted in phantom, of the lowermost roller structure associated with the net-supporting frame.
Figure 7:
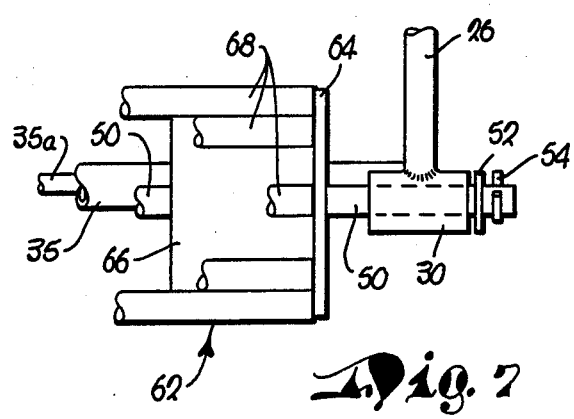
FIG. 7 is a fragmentary view further illustrating the construction of the roller assembly.

FIG. 1 illustrates a boat of the type referred to in the above identified pending application for U.S. Letters Patent Ser. No. 629,087. The boat 74 includes a pair of booms or outriggers 76 respectively pivotally coupled to uprights 78. Each of the outriggers 76 carriers a net line 80 which is in turn coupled, through conventional clevis arrangement 82 (see FIG. 2), to the central clevis 48 of a net assembly 10. As the boat 74 is thus advanced through the water, the frame assembly 12 assumes an inclined orientation as depicted in FIGS. 2–4. The maximum extent of this inclination is determined by central guiding member 56 which engages the seabed 84 ahead of net 14. In practice, an angle of 20 to 25 degrees relative to the seabed has been found to give efficient results.

As the net assembly 10 is thus advanced, the respective rollers 60, 62 rotate relative to lower frame member 50. Inasmuch as each of the rollers 60, 62 includes a plurality of circumferentially spaced rods, it will be appreciated that the rollers in effect repeatedly strike the seabed 84. As noted previously, it has been found that this repeated striking action against the seabed causes aquatic life congregating adjacent the seabed to move upwardly. Thus, as assembly 10 is further advanced, this aquatic life passes through mouth 18 and into the confines of trailing net 14.

The respective fingers 70 of frame assembly 12 particularly come into play when the overall net assembly is used in shallow grass flats. This action is illustrated in FIG. 3, where it will be seen that as the net assembly is pulled through such grass flats, the fingers 70 act much in the manner of an agricultural combine to "comb" the beds for small aquatic life such as shrimp and scallops. Moreover, it has been found that flounder, who feed on shrimp and scallop in the grass flats, tend to turn to a vertical position by virtue of the vibrations created by rolling action of the multiple-bar rollers 60, 62, and thus pass unimpededly through the respective fingers 70 (which are typically $2\frac{1}{2}$ inches apart). After entering net 14, flounder tend to turn sideways again however, and thus cannot pass back out through mouth 18 and are effectively trapped.

The rolling and striking action of the rollers 60, 62 permits fishing in shallow flats without damaging the grass or the seabed. This is to be contrasted with conventional fishing equipment which tends to tear up grass and throw it into the net, thus severely disturbing the natural ecology of the coastal flats.

Further, the cooperative relationship of the rods 70 and the rollers 60, 62 facilitates passage of the net assembly over rocks or other obstructions. As illustrated in FIG. 4, if an obstruction such as a rock 86 is encountered, the respective rods 70 are first deflected backwardly until the rollers 60, 62 are engaged. At this point the rods cannot be moved further back because of the dimensional interference with the rollers. However, the assembly can in this condition effectively ride over the obstruction and, once cleared, the net assembly again contacts the seabed and continues its normal operation.

Each of the nets 14 is provided with a secondary tie-off line secured thereto at a point rearwardly of mouth 18. Thus, when the net 14 is partially full, this line can be tightened to prevent escape of the catch, and this rearward end of the net is elevated onto the stern of boat 74 for unloading. This unloading operation can be achieved during continued fishing operations, so that maxium catches can be realized in a minimum period of time.

The net assemblies in accordance with the present invention have been found to be particularly advantageous in water of up to about 12 feet in depth, although as indicated excellent results can be obtained in much shallower waters. Although the lateral width of the frame assemblies 14 may vary, in practice it has been found that such should not exceed about 10 feet. With wider frames, there is a tendency to bridge depressions in the seabed, rather than following the general contour thereof, and this tends to decrease yields.

Although the net structure of the invention has been described in the context of salt water operations, those skilled in the art will recognize that, in appropriate cases, it could also be used in fresh water.

I claim:

1. A pull-behind net-supporting frame assembly for shrimping or fishing operations, comprising a frame defining an upright, elongated, transversely extending, open catch receiving mouth;

means for attachment of a net in trailing relationship to said frame and in disposition for capturing catch passing through said mouth, said frame further including a plurality of elongated, laterally spaced apart fingers supported by said frame forwardly of said roller means and extending in an upright direction for a substantial portion of the vertical extent of said mouth; and elongated, axially rotatable, bottom-engaging roller means operatively coupled with said frame and located along the normal underside of the frame for supporting the latter, said fingers terminating at their lower ends, at a point below the upper periphery of said roller means for preventing movement of the fingers rearwardly past the roller means.

2. The frame assembly of claim 1, said fingers being formed of spring steel rods.

3. A pull-behind net-supporting frame assembly for shrimping or fishing operations, comprising:

frame means defining an upright, elongated, transversely extending, open, catch-receiving mouth;

means for attachment of a net in trailing relationship to said frame means and in disposition for capturing catch passing through said mouth; and a plurality of elongated, laterally spaced apart fingers supported by said frame means and extending in an upright direction for a substantial portion of the vertical extent of said mouth.

4. The frame assembly of claim 3, said frame assembly including elongated, laterally extending, lower structure situated adjacent the underside of said mouth, said fingers terminating, at their lower ends, at a point below the upper periphery of and in front of said lower structure for preventing movement of the fingers rearwardly past the lower structure.

5. The frame assembly of claim 4, said fingers being formed of spring steel rods.

* * * * *